F. G. BIRD.
BREAD MAKING MACHINE.
APPLICATION FILED APR. 25, 1911.
999,089.
Patented July 25, 1911.
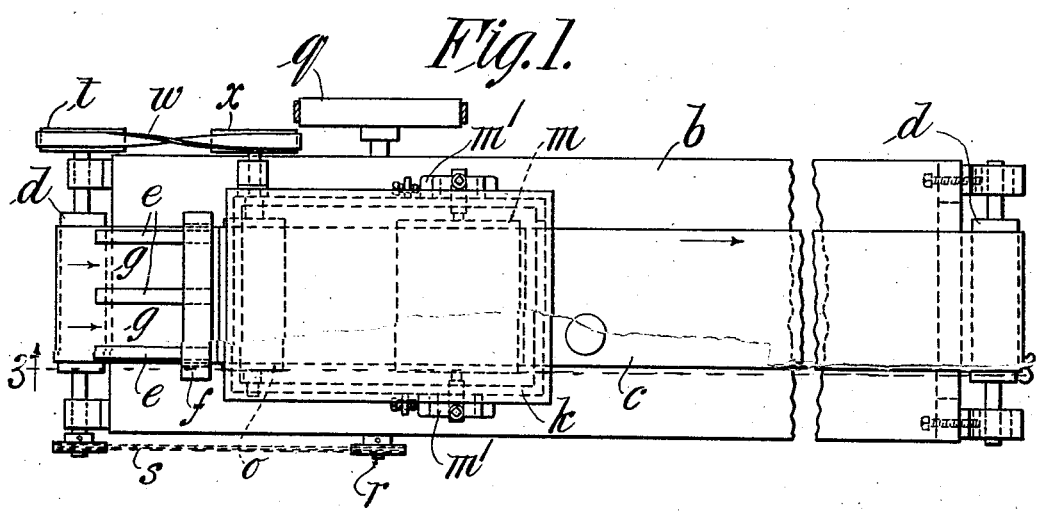
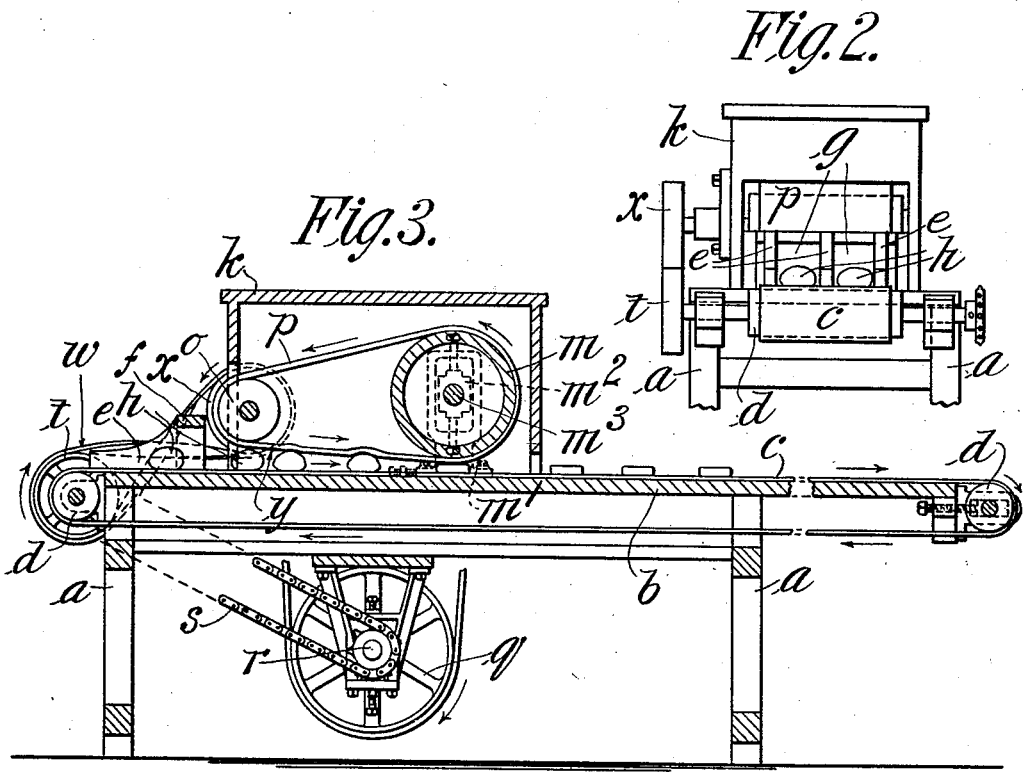
WITNESSES:
H. L. Sprague
Harry W. Bowen
INVENTOR,
Frank G. Bird,
BY
Chapin & Co.
ATTORNEY.

UNITED STATES PATENT OFFICE.

FRANK G. BIRD, OF SPRINGFIELD, MASSACHUSETTS.

BREAD-MAKING MACHINE.

999,089.　　　　　Specification of Letters Patent.　　Patented July 25, 1911.

Application filed April 25, 1911. Serial No. 623,234.

*To all whom it may concern:*

Be it known that I, FRANK G. BIRD, a citizen of the United States of America, residing at Springfield, in the county of Hampden and State of Massachusetts, have invented new and useful Improvements in Bread-Making Machines, of which the following is a specification.

This invention relates to bread making, and specifically to a machine for forming lumps of dough into flattened disks, the object of the invention being to provide a machine which will perform its functions without an undue breaking down of the cellular structure of the dough, due to the " raising " of the latter, and to perform its function in one operation.

The invention is clearly illustrated in the accompanying drawing, and is fully described in the specification and summarized in the claims appended thereto.

In the drawings forming part of this application,—Figure 1 is a plan view of the machine embodying the invention. Fig. 2 is an elevation of the feed end of the machine,—viz., the left-hand end of Fig. 1. Fig. 3 is a longitudinal section of the machine, in elevation, the plane of the section being taken on the line 3—3, Fig. 1.

Referring to the drawings, $a$ is the frame of the machine which is provided with a table top $b$ extending the whole length thereof, an endless belt-conveyer $c$ (preferably of canvas) running over this table lengthwise being supported on two rolls $d$ one at either end of the table.

At the feed end of the machine (which is the left-hand end of Figs. 1 and 3) there is mounted a frame supported on the table at either side of the conveyer $c$, said frame comprising three longitudinally disposed partitions $e$ held in position by a cross-bar $f$, and supports for the cross-bar (not shown) extending to the table. These partitions $e$ provide means for alining the pieces of dough in the passages $g$ between the partitions $e$, the lumps of dough being shown in Fig. 3 and indicated by $h$.

Directly beyond the frame above referred to is a housing $k$ inclosing two rolls $m$ and $o$ over which runs a flexible belt $p$ of canvas, preferably, these two rolls being so disposed that the lower portion of the belt $p$ (or that part thereof contiguous to the conveyer $c$) will be inclined relative thereto, the wider part of the space measured vertically between the two belts being contiguous to the feed end of the machine. The roll $m$ is made adjustable vertically, whereby the angularity of the space between the flexible belt $p$ and the belt conveyer $c$ and the distance between the roll and the table may be varied. This adjustability is effected by means of the screws $m^1$, between the ends of which the journals $m^2$ are supported in which are seated the ends of the shaft $m^3$ which carry the roll $m$.

Movement is imparted to the various elements of the machine by means of a pulley $q$ mounted on a shaft $r$ beneath the table, a drive-chain $s$ extending from a sprocket on the shaft $r$ to another sprocket on the shaft on which the roll $d$ at the feed end of the table is secured; and on this shaft is also secured a driving-pulley $t$ which, by means of a cross-belt $w$, and a pulley $x$ on the shaft of the roll $o$, rotates the latter, the linear speed of the belt $p$ being the same as that of the endless belt conveyer $c$.

While this machine does not differ in its main elements very greatly from other machines used in this art, there is one important difference, and that lies in the use of the flexible belt $p$ coacting with the endless belt conveyer $c$, and running at the same linear speed.

Various attempts have heretofore been made to accomplish what this machine accomplishes, though unsuccessfully, because of the fact that as constructed, machines heretofore built for this purpose have applied to the lumps of dough $h$ an unyielding pressure to produce the flattening effect desired. It is impossible, in one operation, to transform one of the lumps of dough $h$ (which enters the machine somewhat in the form of a flattened sphere,) into a relatively thin disk, without the use of the flexible belt $p$. If one of such lumps of dough is passed between two unyielding surfaces for the purpose of flattening it, it will invariably be elongated, and to overcome this result machines have been built consisting of two pressing devices but located at right angles one to the other, whereby the elongated form given to the articles as they pass through the first flattening device are fed to the second flattening device at right angles thereto to correct the elongation imparted to the articles in one direction by imparting thereto an elongation at right angles to the first; but by means of machines of this type only an approximately circular form is given to the articles.

The articles are fed into the machine after the dough has been raised and for the purpose of giving the articles their final form before they are placed in the oven for baking; and it is of the greatest importance that the cellular structure of the lumps h, due to the raising effect of the yeast, be not rudely broken down in the flattening process to which they are subjected, otherwise the bread or buns, after baking, will be heavy or soggy. This breaking down of the cellular structure of the lumps h invariably occurs when these articles are passed rapidly between two unyielding surfaces.

If the belt p in this machine were run under sufficient tension to produce a hard, board-like surface, or if it were backed up by an unyielding surface over which it would run as the belt c runs over the table b, the machine would be inoperative as to the quality of its product, such a machine, in fact, being unusable. The same is true of that class of machines in which the lumps h are passed between a roll and a conveyer belt run over the table, but if the belt p, as in applicant's machine, is free to yield as the lumps of dough pass under it, its tension may be regulated not only to apply the exact pressure required by the lumps h but also to permit the surface of the belt to take the form, as it were, of the upper part of each lump as it passes beneath the belt, thus making a sort of a pocket for these lumps which insures a uniform spreading effect during the flattening process, as though the top of each lump were covered by a flexible mold which, as the lumps reach the narrowest point of the space between the belts, will gradually flatten out until, as the lumps pass under the roll m, the pocketing effect of the belt gradually disappears, the final thickness being imparted to each lump by the adjustment of the roll m relative to the table b. Treated in this way, the air cells which give the bread its lightness, have a chance to adjust themselves to the gradual change of form of the lumps h, and the pressure applied to these lumps, being of a yielding nature, prevents the breaking down of the cellular structure thereof while the pocketing action of the belt, as the lumps h pass under it, insures the formation at one operation of substantially disk-shaped articles of uniform thickness.

This machine has another function in its adaptability to the formation of long, slender rolls to make which from lumps of dough similar to those heretofore described, it is only necessary to remove the driving belt w; whereupon the belt p will remain stationary relative to the conveyer belt, and then each of the lumps h, as it enters the space y between the two belts, will be given a rolling motion due to its frictional contact with the stationary belt p, and the moving belt-conveyer c. But as this rolling motion takes place against a yielding abutment, that is the belt p, these articles may be rolled out, as described, without injury to the structure thereof.

What I claim, is:—

1. A bread making machine comprising a table and a conveyer belt running thereover, a second belt above the conveyer belt, and means to support said second belt, together with means to move both belts at the same linear speed, the direction of movement of said two belts being in converging planes, said second belt being yieldingly mounted on its support whereby a lump of dough passing between the belts will have an unyielding support on one side and a yielding support on the opposite side.

2. In a bread making machine, mechanism to convey a lump of dough through the machine comprising two conveyer belts, one of said belts having an unyielding support, the other belt having a yielding surface, whereby said lump conveyed by said belts will have an unyielding support on one side thereof, said yielding belt being adapted to conform itself more or less to the shape of the opposite side of said lump.

3. In a bread making machine, mechanism to convey a lump of dough through the machine comprising two conveyer belts movable in converging planes at the same linear speed and in the same direction, one of said belts having an unyielding support, the other belt being yielding, whereby said lump conveyed by said belts will have an unyielding support on one side thereof, said second belt being adapted to yield in conformity to the shape of the lump of dough opposite to that supported on said unyielding belt, and means to adjust one of said belts relative to the other at right angles to the line of movement thereof.

FRANK G. BIRD.

Witnesses:
 HARRY W. BOWEN,
 WM. H. CHAPIN.

---

Copies of this patent may be obtained for five cents each, by addressing the "Commissioner of Patents, Washington, D. C."